United States Patent [19]

Hibino et al.

[11] Patent Number: 4,712,452
[45] Date of Patent: Dec. 15, 1987

[54] METHOD FOR DIRECTING AN UP-SHIFT OPERATION FOR A VEHICLE WITH A MANUAL TRANSMISSION

[75] Inventors: Yoshitaka Hibino, Utsunomiya; Hiroshi Kogure, Tokorozawa, both of Japan

[73] Assignee: Honda Giken Kogyo Kabushiki Kaisha, Tokyo, Japan

[21] Appl. No.: 778,054

[22] Filed: Sep. 20, 1985

[30] Foreign Application Priority Data

Sep. 28, 1984 [JP] Japan ................. 59-203279

[51] Int. Cl.$^4$ .............................. B60K 41/06
[52] U.S. Cl. ........................ 74/866; 74/863
[58] Field of Search ......... 74/862, 863, 865, DIG. 7, 74/336 R, 866; 340/52 R; 364/424.1

[56] References Cited

U.S. PATENT DOCUMENTS

| | | | |
|---|---|---|---|
| 4,355,296 | 10/1982 | Drone | 340/52 R |
| 4,438,423 | 3/1984 | Stier | 74/DIG. 7 |
| 4,539,868 | 9/1985 | Habu | 364/424.1 |
| 4,555,691 | 11/1985 | Hosaka et al. | 340/52 R |
| 4,559,599 | 12/1985 | Habu et al. | 364/424.1 |

*Primary Examiner*—Rodney H. Bonck
*Assistant Examiner*—Martin G. Belisario
*Attorney, Agent, or Firm*—Pollock, VandeSande & Priddy

[57] ABSTRACT

A method for indicating a running condition of a vehicle having an engine and a manual transmission generates a direction of an up-shift operation according to detected results of the throttle position, the gear position, the vehicle speed, and the engine load. The direction of the up-shift operation is basically generated when the throttle valve is open, a medium speed gear is engaged, and the vehicle speed is above a predetermined level. Besides, the generation of the direction of the up-shift operation is stopped when the load of the engine suitably detected by the pressure in the intake manifold is in a medium load range.

3 Claims, 4 Drawing Figures

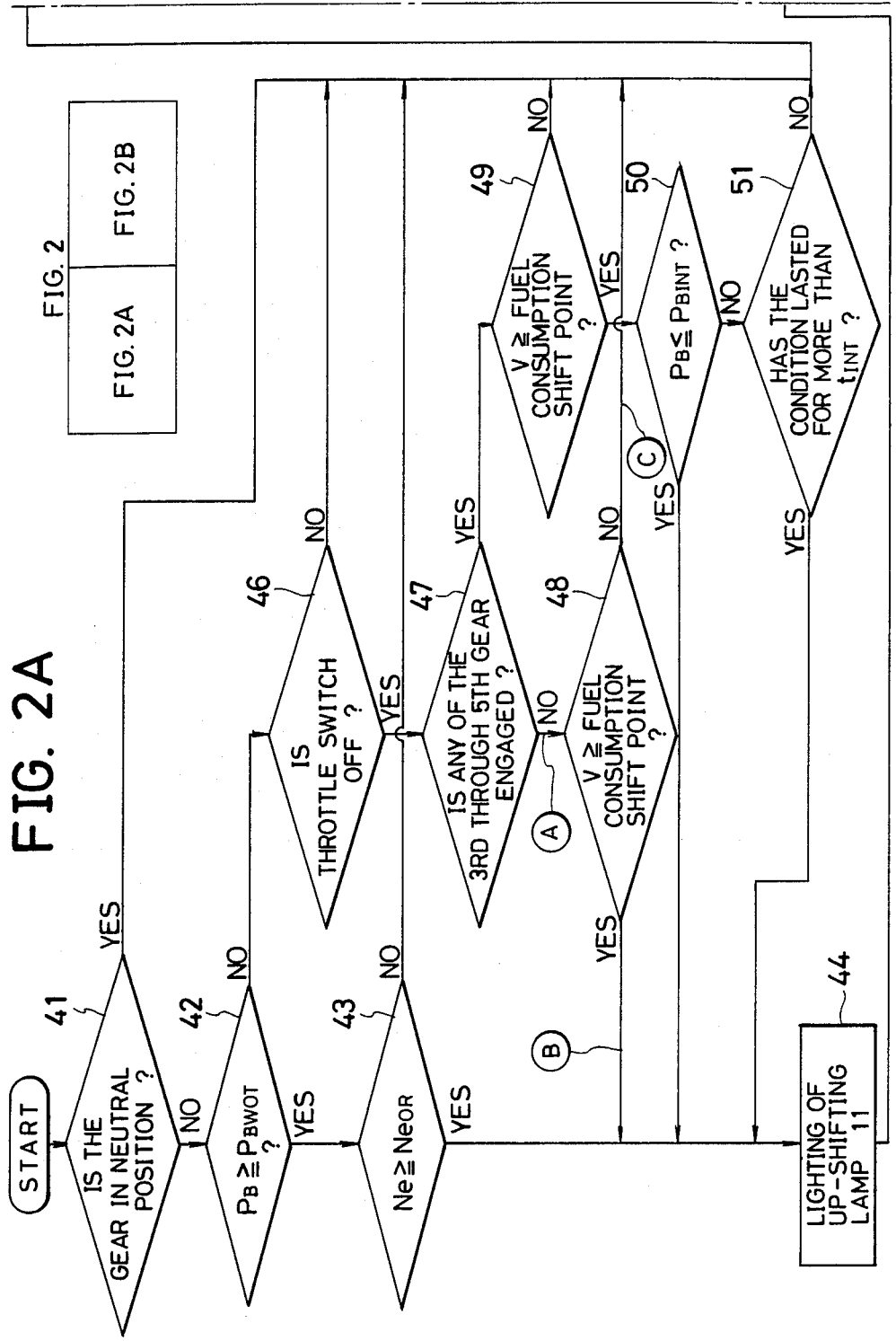

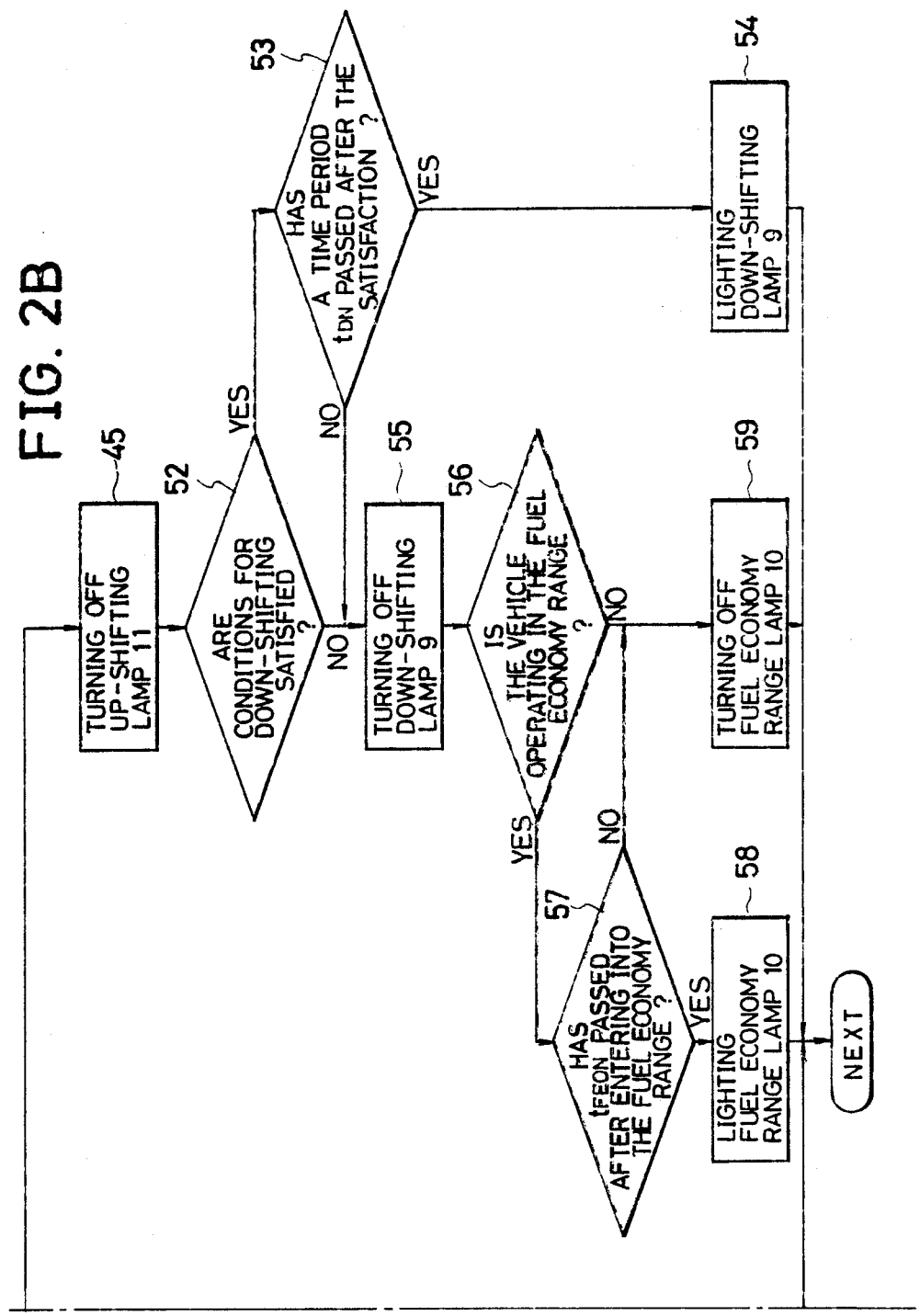

METHOD FOR DIRECTING AN UP-SHIFT OPERATION FOR A VEHICLE WITH A MANUAL TRANSMISSION

BACKGROUND OF THE INVENTION

1. Field of the Invention

The present invention relates to a method for directing an up-shift operation for a vehicle with a manual transmission, or in other words, for indicating that the vehicle is running under a condition in which an up-shifting of the manual transmission is needed.

2. Description of Background Information

For vehicles having a manual transmission, various techniques for indicating an appropriate gear position have been proposed. For instance, Japanese Patent Application laid open No. 55-31699 discloses a method in which a driving condition requiring an up-shift operation is judged by means of operating parameters of the vehicle such as the rotational speed of the engine, the opening degree of the throttle valve, and the gear position or the vehicle speed. However, other operating parameters are usually not utilized. Therefore, there can be a case that the running condition of the vehicle is judged that the up-shifting of the manual transmission is necessary although the vehicle is running on an uphill road. A direction of the up-shift operation is in turn generated in response to the judgment. In that case, if a driver of the vehicle up-shifts the gear position in accordance with the direction under that running condition, it becomes difficult to maintain the vehicle speed and an immediate down-shift operation will become necessary. therefore, it is conceivable to continuously stop generating the direction of the up-shifting when the engine load is relatively high. However, this measure is not practical because the necessary direction of up-shifting may not be generated, for example, when the vehicle is entering into an expressway through an acceleration lane. Thus, in this kind of situation, the vehicle will be prevented from entering into the operation of low fuel consumption. Therefore, an improved method for indicating up-shift operation which is free from these problems has long been required.

OBJECT AND SUMMARY OF THE INVENTION

An object of the present invention is therefore to provide a method for directing an up-shift operation to the driver which is free from such an inconvenience that the down-shifting becomes necessary immediately after the driver up-shifts the transmission, and is capable of indicating a gear position appropriate for driving the vehicle within a range of low fuel consumption.

According to the present invention, a method for directing an up-shift operation is characterized in that the generation of up-shift direction is stopped when a detected engine load is in a range of middle load even though usual conditions for up-shifting, such as the wide opening of the throttle valve, the engagement of a middle speed gear, and the vehicle speed above a predetermined reference speed, are satisfied at the same time.

BRIEF DESCRIPTION OF THE DRAWINGS

FIG. 2, encompassing combined FIGS. 2A and 2B is a flowchart showing steps of an embodiment of the up-shift operation directing method according to the present invention.

DETAILED DESCRIPTION OF PREFERRED EMBODIMENTS

Figure 1:
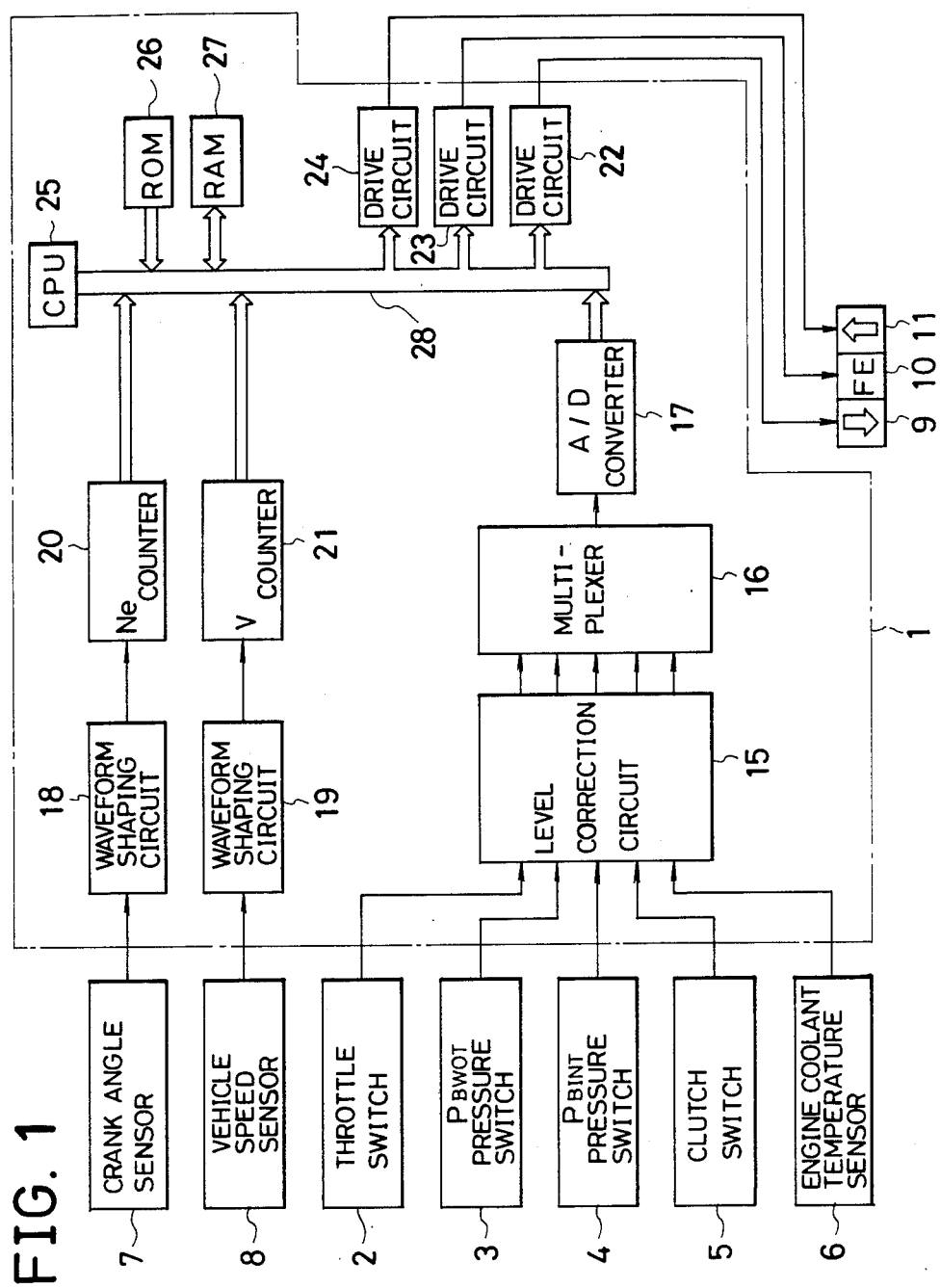
FIG. 1 is a block diagram of a system for indicating running states of the vehicle, in which the up-shift operation directing method according to the present invention is suitably applied.

Reference is first made to FIG. 1, showing a device for indicating running states of the vehicle in which the method for direction up-shifting according to the present invention is applied. This running states indication device includes a control circuit 1 which comprises a microcomputer. The control circuit 1 receives various sensor output signals, from a throttle switch 2, pressure switches 3 and 4, a clutch switch 5, an engine coolant temperature sensor 6, a crank angle sensor 7, and a vehicle speed sensor 8. Lamps 9 through 11 are also connected to the control circuit 1. The throttle switch 2 is adapted to turn on when a throttle valve of an internal combustion engine is closed. The pressure switch 3 turns on when a pressure $P_B$ in an intake manifold downstream of the throttle valve is equal to or greater than a predetermined level $P_{BWOT}$ ($-85$ mmHg for example), and the pressure switch 4 turns on when the pressure $P_B$ in the intake manifold downstream of the throttle valve is equal to or greater than another predetermined level $P_{BINT}$($-370$ mmHg for example) which is smaller than $P_{BWOT}$. The clutch switch 5 turns on when a clutch is disengaged to interrupt the transmission of engine power. These switches 2 through 5 produce a predetermined voltage when activated. the engine coolant temperature sensor 6 produces an output signal whose level varies with the temperature of the engine coolant. The crank angle sensor 7 generates an angular position signal whose period is inversely proportional to the rotational speed of the engine crankshaft. Similarly, the vehicle speed sensor 8 produces an angular position signal whose period is inversely proportional to the rotational speed of an output shaft of the manual transmission. The lamp 9 is provided to indicate that the vehicle is running under a condition in which a down-shift of the manual transmission is required. On the other hand, the lamp 10 indicates that the vehicle is running under the fuel saving condition. In addition, the lamp 11 indicates that the vehicle is running under a condition in which an up-shifting of the manual transmission is required.

The control circuit 1 includes a level correction circuit 15 for correcting levels of signals from the throttle switch 2, the pressure switches 3 and 4, the clutch switch 5, and the engine coolant temperature sensor 6. Output signals of the level correction circuit 15 are then supplied to a multiplexer 16 which selectively transmits one of output signals of the switches 2 through 5 and the sensor 6 supplied through the level correction circuit 15. An analog output signal of the multiplexer 16 is in turn supplied to an A/D (analog to digital) converter 17 for converting the analog signal from the multiplexer 16 to a digital signal. The control circuit 1 further includes waveform shaping circuits 18 and 19 respectively for shaping the waveform of the angular position signals from the crank angle sensor 7 and the vehicle speed sensor 8 to square wave pulse signals. An output pulse signal of the waveform shaping circuit 18 is in turn supplied to an $N_e$ counter 20 for measuring intervals of pulses of the output signal of the waveform shaping circuit 18 by counting the number of predetermined clock pulses and producing a digital signal indicative of a value inversely proportional to the rotational speed of the engine. On the other hand, an output signal of the waveform shaping circuit 19 is supplied to a V counter 21 which measures intervals of output pulses of the waveform shaping circuit 19 by counting the number of predetermined clock pulses and producing a digital signal indicative of a value inversely proportional to the vehicle speed. The control circuit 1 further includes drive circuits 22 through 24 for driving the lamps 9 through 11, and a CPU (central processing unit) 25 and a ROM 26 for storing various programs and data, and a RAM 27. The A/D converter 17, the counters 20, 21, the drive circuits 22 through 24, the CPU 25, the ROM 26, and the RAM 7 are mutually connected via an I/O (input/output) bus 28.

In the thus constructed device, information as to the opening and closing of the throttle valve, the pressure $P_B$ in the intake manifold, the engagement or disengagement of the clutch, and the temperature of the engine coolant is selectively supplied to the CPU 25 through the I/O bus 28. Also, information of the engine speed $N_e$ and the vehicle speed V from the $N_e$ counter and the V counter 21 is supplied to the CPU 25 via the I/O bus 28.

The CPU 25 reads in the above mentioned various information according to a program stored in the ROM 26 and determines whether the up-shift is necessary, the down-shift is necessary, or the vehicle is running under the condition of fuel economy, on the basis of this information. When the necessity of up-shift is determined by the CPU 25, a lamp drive command signal is supplied to the drive circuit 24. On the other hand, if the down-shift operation is determined to be necessary, a lamp drive command signal is supplied to the drive circuit 22. In addition, when the operation of the vehicle is detected to be under the fuel saving condition, the lamp drive command signal is supplied to the drive circuit 23.

Referring now to the flowchart of FIGS. 2A and 2B, the operational sequence of the method for directing an up-shift operation according to the present invention will be explained hereinafter.

In this sequence of operations, whether or not the transmission gear is in the neutral position is detected at a step 41 first. This detection is performed in such a manner that the gear position is judged to be in neutral when the ratio between the engine rotational speed $N_e$ and the vehicle speed V is out of a range determined by the gear ratio of each gear. If the gear is not in neutral, whether or not the pressure $P_B$ in the intake manifold is equal to or greater than the predetermined level $P_{BWOT}$ (on the atmospheric pressure side) is detected at a step 42. If $P_B \geq P_{BWOT}$, it means that the throttle valve is fully opened and the vehicle operation is not economical. Then whether or not the engine rotational speed is equal to or above a predetermined rotational speed $N_{eOR}$ (5500r.p.m. for instance) is detected at a step 43. If $N_e \geq N_{eOR}$, it is regarded that the acceleration of the vehicle is sufficient and a lamp drive command signal is supplied to the drive circuit 24. As a result, the lamp 11 for directing the up-shift operation is lit up at a step 44 to prevent the engine from over revolution. When $N_e < N_{eOR}$ or when the gear position is detected to be in neutral position in the step 41, a lamp drive stop command signal is supplied to the drive circuit 24 to stop the lighting of the lamp 11, that is, the generation of the up-shift direction is stopped at a step 45. On the other hand, if $P_B < P_{BWOT}$ at the step 42, whether or not the throttle switch 2 is switched off is detected at a step 46. If the throttle switch 2 is in the on position, it means that the throttle valve 2 is fully closed and the program goes to the step 45 so as to stop the lighting of the lamp 11. This operation is provided so as to secure the braking force of the engine with the fully closed throttle valve, i.e. the effect of an engine brake by preventing the up-shifting, which braking force will be otherwise weakened. If the throttle switch 2 is in the off position, it means that the throttle valve is open. At the same time, the gear position, specifically whether or not any one of the third to fifth gears is engaged, is detected at a step 47. The detection is performed using a ratio between the engine rotational speed $N_e$ and the vehicle speed V. If a result of detection is that the first or the second gear is engaged, whether or not the vehicle speed is equal to or above a predetermined fuel consumption shift point is detected at a step 48.

Figure 3:
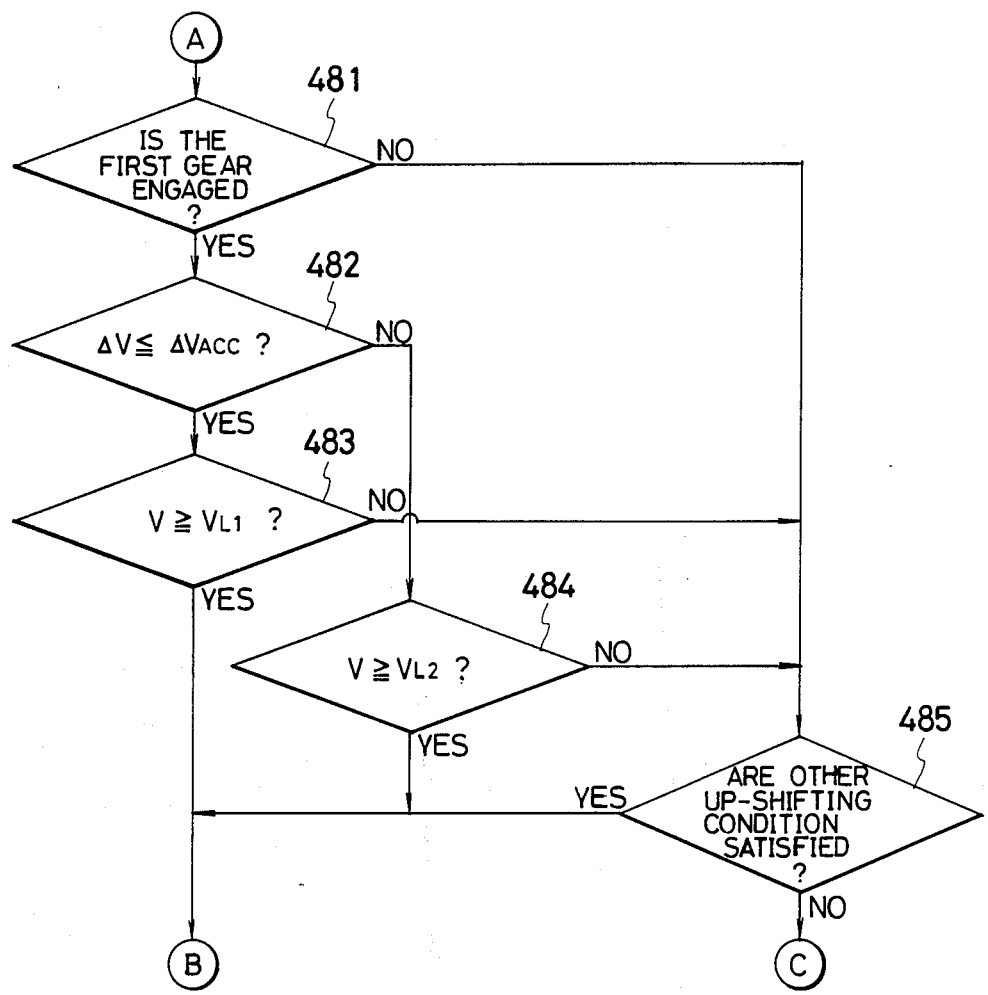
FIG. 3 is a flowchart showing a detail of the step 48 for detecting the vehicle speed in the up-shift operation directing method shown in FIGS. 2A and 2B.

As shown in FIG. 3, the step 48 consists of several sub-steps 481 through 485. At the step 481, whether or not the first gear is engaged is detected. If the result is "yes", a speed of the change $\Delta V$ in the vehicle speed V is compared, at a step 482, with a predetermined speed of variation $\Delta V_{ACC}$ (2.9Km/h/sec² for example). If $\Delta V < \Delta V_{ACC}$, it is regarded that the vehicle is accelerating slowly and the vehicle speed V is compared with a predetermined reference speed $V_{L1}$ (15Km/h for example) at the step 483. If, on the other hand, $\Delta V > \Delta V_{ACC}$, it is regarded that the vehicle is accelerating at a medium rate and whether or not the vehicle speed V is equal to or above a second predetermined reference speed $V_{L2}$ (20Km/h for instance) is detected at the step 484. If $V \geq V_{L1}$ or $V \geq V_{L2}$ at the steps 483 and 484, program goes to the step 44 to turn on the lamp 11 for directing the up-shift operation. If, on the other hand, $V < V_{L1}$ or $V < V_{L2}$ at the steps 483 and 484, whether or not the vehicle is operating under a state satisfying other up-shift conditions is detected at the step 485. If the other up-shift conditions are satisfied, the operation of the step 44 is then performed. If the other up-shifting conditions are not satisfied, the operation of the step 45 is performed to stop the lighting of the lamp 11. If the gear position is detected to be other than the first gear at the step 481, i.e. if it is detected that the second gear is engaged, whether or not the vehicle speed is high enough to turn on the lamp 11 is also detected at the step 485. Also, in this case the vehicle speed may be compared with either one of the reference speeds $V_{L1}$ and $V_{L2}$ as in the case where the first gear is engaged. These reference speeds have, however, different values from those in the case where the first gear is engaged, depending on the speed of the change $\Delta V$ in the vehicle speed V.

Thus, if the vehicle speed V is equal to or above the fuel consumption shift point, the lamp 11 is turned on for directing the up-shift operation so as to prevent excessive fuel consumption. If the vehicle speed V is below the fuel consumption shift point, the lamp 11 is turned off at the step 45.

If the detected gear position at the step 47 is either one of the third through fifth gears, the vehicle speed V is compared with the fuel consumption shift point whose level is determined for each gear position at a step 49. If the vehicle speed V is below the fuel consumption shift point, the operation at the step 45 is performed to turn off the lamp 11. If, on the other hand, the vehicle speed V is above the fuel consumption shift point, whether or not the pressure $P_B$ in the intake manifold is equal to or below a predetermined pressure $P_{BINT}$ (on the vacuum side) is detected at a step 50. If $P_B \leq P_{BINT}$, the lamp 11 is turned on at the step 44 to promote the reduction of the fuel consumption. If $P_B > P_{BINT}$, it is regarded that the engine operation is in the middle load range, and it is conceivable, if the up-shift operation is performed, that the vehicle speed cannot be maintained even with the fully opened throttle valve when the vehicle is running on an up-hill road. In that case, a down-shifting will be required immediately. Therefore, after the condition of $P_B < P_{BINT}$ has been satisfied, whether or not that state has continued for a predetermined time period $t_{INT}$ (3 seconds for example) is detected at a step 51. If the state has not continued for this period, the operation at the step 45 is performed to turn off the lamp 11 for directing the up-shift operation. If, on the other hand, the state has continued for this time period of $t_{INT}$, the operation at the step 44 is performed to turn on the lamp 11 for directing the up-shifting.

After turning off of the lamp 11 at the step 45, whether or not the vehicle operation satisfies a down-shift condition is detected at a step 52. In the step 52, the answer will be "yes" when, for instance, the vehicle operation satisfies the following conditions: (1) any of the 2nd through 5th gears is engaged with the clutch connected; (2) engine speed is in a medium-low range (equal to or lower than 300 rpm); and (3) the vehicle operation is under any of the following states: (i) the vehicle is running on a down hill road with a gears of high position (any of the 3rd through 5th gear) engaged; (ii) the vehicle is running on an up hill road; and (iii) engine speed is equal to or lower than a predetermined set level which becomes low as the engine load decreases. If the down-shift condition is satisfied, whether or not a predetermined time period $t_{DN}$ has passed after satisfying the down-shift condition is detected at a step 53. If the predetermined time period $t_{DN}$ had passed, a lamp drive command signal is supplied to the drive circuit 22 to turn on the lamp 9 for directing the down-shift operation at a step 54. If, on the other hand, the predetermined time period $t_{DN}$ has not passed after satisfying the down-shift condition, a lamp drive stop command signal is supplied to the drive circuit 22 to stop the lighting of the lamp 9 at a step 55. This operation is provided for preventing an instantaneous lighting of the lamp 9. The operation at the step 55 is also performed if it is detected at the step 52 that the down-shift condition is not satisfied. Next, whether or not the vehicle operation is in the fuel economy range, i.e. the range of low fuel consumption, is detected at a step 56. In the step 56, an answer will be "yes" when, for instance, the vehicle operation satisfies all of the following conditions: (1) any of the second through fifth gears (except the first gear) is engaged with the clutch connected; (2) vehicle speed is in a medium speed range (15Km/h through 103Km/h); (3) the engine speed is on a high revolution side; and (4) the vehicle is not decelerating ($\Delta V > -10\text{Km/h/sec}^2$). If the vehicle operation is detected to be in the fuel economy range, whether or not a predetermined time period $t_{FEON}$ has passed after the entrance of the vehicle operation into the fuel economy range is detected at a step 57. If the predetermined time period $t_{FEON}$ has passed, a lamp drive command signal is supplied to the drive circuit 23 to turn on the lamp 10 for indicating the vehicle operation in the fuel economy range at a step 58. If the predetermined time period $t_{FEON}$ has not passed after the vehicle operation entered into the fuel economy range, a lamp drive stop command signal is supplied to the drive circuit 23 to stop the lighting of the lamp 10 at a step 59. This step is provided for preventing an instantaneous lighting of the lamp 10. If the vehicle operation is not in the fuel economy range, the operation at the step 59 is also performed to turn off the lamp 10 for indicating the vehicle operation under the fuel economy range.

It will be appreciated from the foregoing, in the case of the method for directing the up-shift operation according to the present invention, the direction for up-shifting operation is prevented from being generated when the engine load is in the medium load range. Therefore, the direction for the up-shifting operation is not generated when the vehicle is running on an up-hill road. In this way, a state requiring the down-shift operation immediately after an up-shifting operation is required is avoided to greatly improve the driveability. Of course, the vehicle operation under the fuel economy range is facilitated by the direction for up-shifting operation generated when the operation of the vehicle under the medium load is continued.

What is claimed is:

1. In a method for directing an up-shift operation for a vehicle having an internal combustion engine and a manual transmission of at least three forward gear positions, including steps of detecting an opening angle of a throttle valve of said internal combustion engine, detecting a gear position of said manual transmission, detecting a vehicle speed, and generating a direction of an up-shift operation when said throttle valve is open, a medium speed gear of said manual transmission is engaged, and said vehicle speed is above a predetermined value, wherein the improvement comprises a step for detecting a high load range, a medium load range and a low load range of said internal combustion engine, said low load range being between said medium load range and a range in which the throttle valve is fully closed, said high load range being between said medium load range and a range in which the throttle valve is fully open, a step for stopping the generation of said direction of up-shift operation when the load of the internal combustion engine is in the medium load range, and a step for immediately directing an up-shift operation when the load of the internal combustion engine is in the low load range or is changed from the high load range to the low load range, in which said stop of the generation of the direction of up-shifting operation is cancelled when a predetermined time period has passed since the load of the internal combustion engine entered into the medium load range.

2. A method as set forth in claim 1, wherein said medium load range is a range in which a pressure in an intake manifold of the engine is on or between a first predetermined level which is smaller than an atmospheric pressure and a second predetermined level smaller than said first predetermined level.

3. A method as set forth in claim 1, wherein said medium load range is a range in which a pressure in an intake manifold of the engine is on or between a first predetermined level which is smaller than an atmospheric pressure and a second predetermined level smaller than said first predetermined level.

* * * * *